(12) United States Patent
Bingham et al.

(10) Patent No.: US 7,203,625 B2
(45) Date of Patent: Apr. 10, 2007

(54) MULTISIDED SHARING OF DYNAMIC DATA IN A WIRELESS TEST ENVIRONMENT

(75) Inventors: David E Bingham, Fort Collins, CO (US); Carolyn Darbie, Fort Collins, CO (US); Stephen Craig Booth, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/195,979

(22) Filed: Aug. 3, 2005

(65) Prior Publication Data

US 2007/0032991 A1   Feb. 8, 2007

(51) Int. Cl.
*G06F 19/00* (2006.01)
*G06F 15/00* (2006.01)

(52) U.S. Cl. .................. 702/189; 702/108; 702/122; 714/38

(58) Field of Classification Search ............... 702/108, 702/121, 122, 123, 189; 714/38, 43; 709/203, 709/217, 224; 713/201
See application file for complete search history.

(56) References Cited

U.S. PATENT DOCUMENTS 6,044,398 A    3/2000   Marullo

2002/0065911 A1*  5/2002  von Klopp et al. .......... 709/224
2002/0122054 A1*  9/2002  Hind et al. ................. 345/731

FOREIGN PATENT DOCUMENTS

| WO | WO9749036 A1 | 12/1997 |
|---|---|---|
| WO | WO0022534 A1 | 4/2000 |
| WO | WO03050681 A1 | 6/2003 |
| WO | WO0157671 A1 | 1/2007 |

OTHER PUBLICATIONS

U.S. Appl. No. 11/195,978, filed on Aug. 3, 2005 to Bingham et al. entitled "Multisided Synchronization of Execution in a Wireless Test Environment" having Agilent Invention Disclosure No. 10051090.

* cited by examiner

*Primary Examiner*—Bryan Bui

(57) ABSTRACT

Methods, devices and systems for sharing or transferring dynamically-generated data between or among multi-sided test components in a wireless environment are described. Multiple flows are initiated substantially simultaneously. Dynamically generated data are shared between or among agents using dynamic data content servlets that employ open communication standards or protocols, such as HTTP or HTTPS.

41 Claims, 3 Drawing Sheets

MULTISIDED SHARING OF DYNAMIC DATA IN A WIRELESS TEST ENVIRONMENT

RELATED PATENT APPLICATION

U.S. patent application Ser. No. 11/195,978 filed on Aug. 3, 2005 to Bingham et al. entitled "Multisided Synchronization of Execution in a Wireless Test Environment" having Agilent Invention Disclosure No. 10051090 and assigned to Agilent Technologies is hereby incorporated by reference herein in its entirety.

FIELD OF THE INVENTION

The present invention relates to an apparatus, system and method for sharing dynamic data between or among multi-sided tests, and more particularly to an apparatus, system and method for testing one or more networks and sharing dynamic data between or among multiple flows in multi-sided tests.

BACKGROUND

The term 'test software' is used to describe a software product whose primary function is to examine how a system is functioning. The test software collects its input from agents, which are individual members of a system being tested.

Some examples where test software is employed include mobile or wireless phone networks and other types of telecommunication networks or systems, river water quality monitors and automobile performance test systems. Some networks or systems may be geographically and/or temporally distributed. The test software for such systems must collect data from different locations or at different times to test such a system.

Despite the many advances that have been made in the field of wireless network testing, certain problems persist. These include an inability to share dynamic data between or among flows or sides in an open manner that employs common standards, an inability to share dynamic data between flows (or virtual threads of execution) except when using a proprietary interface, and an inability to test wireless services that depend on orders of execution between flows unless a proprietary interface is included in the system architecture.

Agilent's Wireless QOS Manager (WQM) is capable of running multi-step, multi-sided tests. However, the SIGOS Site application with which WQM currently integrates is a proprietary interface. In consequence, data being shuttled between one flow and another (or from one side to another) must first flow through the proprietary SIGOS Site infrastructure. A system being tested that does not contain a SIGOS Site infrastructure will not permit the sharing of dynamic data between or among flows or sides.

What is desired is a Wireless QOS Manager having the ability to share dynamic data between or among sides and/or flows, whether or not a SIGOS or other proprietary site infrastructure is being used.

The following publication and patent application, each hereby incorporated by reference herein in its respective entirety, disclose various prior art teachings concerning WQMs:

Agilent Technologies, Inc. Information Sheet entitled "Agilent OSS QoS Manager" viewable at http://we-.home.agilent.com/cqi-bin/bvpub/agilent/Product/cp_Product.isp?OID=536882909&NAV_I D=-536885380.536882909.00&LANGUAGE_CODE
=enq&COUNTRY_CODE=ZZ&CT=PRODUCT&
JPID=/comms/firehunter U.S. patent application Ser. No. 10/736,835 entitled "Sequential Coordination of Test Execution and Dynamic Data" to Bingham As those skilled in the art will appreciate after having read and understood the present Summary, Figures, Detailed Description and Claims, at least some of the devices, systems and methods disclosed in the foregoing publication and patent application may be modified advantageously in accordance with the teachings of the present invention.

SUMMARY OF THE INVENTION

Methods, devices and systems for sharing or transferring dynamically-generated data between or among multi-sided test components in a wireless environment are described. Multiple flows are initiated substantially simultaneously. Dynamically generated data are shared or transferred between or among agents using dynamic data content servlets that employ open communication standards or protocols, such as HTTP or HTTPS.

The present invention includes within its scope the methods of sharing or transferring dynamically generated data described above, hereinbelow and in the Figures, as well as systems and test agents capable of carrying such methods.

In one embodiment of the present invention, dynamic data are shared or transferred between or among multi-sided test components in a wireless environment having at least a first flow on a first side and a second flow on a second side. The method comprises generating, in at least one of the first flow and the second flow, dynamic data; posting, using at least one open common communication standard, the dynamic data to a dynamic content servlet to form posted dynamic data; requesting, from at least one of the first flow and the second flow to the dynamic content servlet, the posted dynamic data; sending, from the dynamic content servlet, the posted dynamic data to the flow requesting the posted dynamic data. The posted dynamic data stored in the dynamic content servlet may also be subjected to "enter," "get," "remove" and/or "replace" instructions effected by means off the aforementioned open common communication standard.

Various embodiments of the present invention my be characterized by one or more of the following aspects:

(a) Sharing of dynamic data between or among multiple flows and/or multiple third-party applications in a wireless service test is permitted using open common communication standards such as such as HTTP or XML, even if a proprietary interface is not employed in the system being tested;

(b) Securely transferring or sharing dynamic data using an HTTPS protocol;

(c) Centralizing dynamic content, which permits all flows access to dynamic data whenever it is needed by a particular flow;

(d) Configuring timeouts as required;

(e) Changing the location of one or more dynamic content servlets, which is especially useful for configurations having firewalls;

(f) Running dynamic content servlets on any Wireless QOS agent or on any web server;

(g) Automatically deleting posted dynamic data that have lived beyond a configurable time;

(h) Multiple tests accessing specific dynamic data simultaneously time based on unique identification provided for each requested test.

The foregoing and other aspects and advantages of various embodiments of the present invention will become apparent and more readily appreciated after the detailed description of the preferred embodiments, the drawings and claims have been read and understood.

DETAILED DESCRIPTION OF THE PREFERRED EMBODIMENTS

Figure 1:
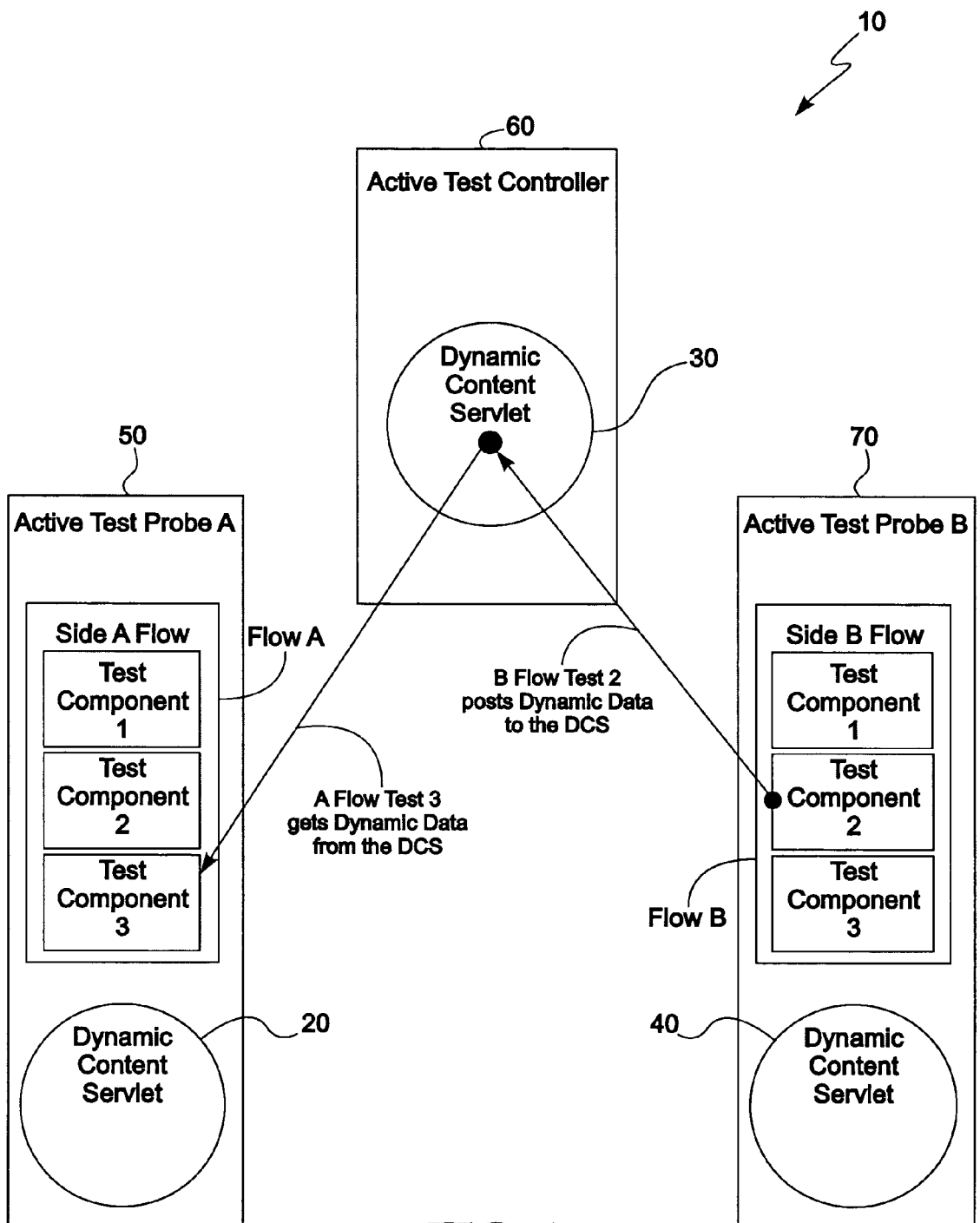
FIG. 1 illustrates one embodiment of the present invention.

FIG. 1 shows one embodiment of the present invention, where first and second flows A and B in a multi-sided test system share and/or transfer dynamically generated data by means of open communication standards using sync servlets 20, 30 and 40 located, respectively, in Active Test Probe 50 corresponding to Flow A, Active Test Controller 60, and Active Test Probe 70 corresponding to Flow B.

In a preferred embodiment of the present invention, each of Active Test Probe 50, Active Test Controller 60 and Active Test Probe 70 is an individual agent in system 10, although other configurations are possible and fall within the scope of the present invention. Note that dynamic content servlets 20 and 40 in FIG. 1 are not employed in the example given below, but may be employed in other configurations or flows not disclosed explicitly herein.

In FIG. 1, Flow A is represented by Test Component 1, Test Component 2 and Test Component 3 in Active Test Probe 50. Flow B is represented by Test Component 1, Test Component 2 and Test Component 3 in Active Test Probe 70. In a preferred embodiment of the present invention, Tests Components within any given Flow are capable off sharing dynamic data between or among one another.

Continuing to refer to FIG. 1, Flows A and B are initiated substantially simultaneously. Execution of Test Component 2 in Flow A causes Test component 2 in Flow B to generate dynamic data that are required for Test Component 3 in Flow A to be successfully executed. Once generated in Test component 2 of Flow B, such dynamic data are posted from Flow B to dynamic data content servlet 30. When Flow A has proceeded to Test Component 3, the dynamic data content residing on sync servlet 30 is retrieved by Test Component 3. Flows A and B may now proceed to complete execution, the necessary dynamic data content having been shared or transferred between or among Flows A and B.

By way of illustrative example only and with no intention of limiting the scope of the present invention, FlowA:test2 in FIG. 1 may be a test that navigates to a webpage requesting authentication information for logging into a 802.11 wifi network, and having the bill and login information sent to a cell phone account. FlowB:test2 then receives the confirmation message on the cell phone with the user name and password. FlowB:test2 then posts the username and password to dynamic content servlet 30. FlowA:test3 then gets the user name and password from dynamic content servlet 30 and uses the user name and password to login to the wifi network.

Note that the embodiment of the present invention shown in FIG. 1 is specifically adapted for use in a wireless service test setting such as a wifi login application, although numerous other applications are contemplated and nevertheless fall within the scope of the present invention.

Continuing to refer to FIG. 1, each of dynamic data content servlets 20, 30 and 40 may be a multi-threaded program running on any of agents 50, 60 and 70 in system 1. Each agent may run a dynamic data content servlet capable of threading multiple test sessions in parallel; not all agents need have a dynamic data content functionality. For example, dynamic data content servlet functionality may be imparted to agents 60 and 70 and not 50, while still permitting at least some of the dynamic data sharing procedures described above to occur. In an optimal system configuration, however, each agent possesses dynamic content servlet functionality.

Dynamic data sharing may be invoked by a caller located remotely from any of the agents of system 10 if the caller is connected to a network to which such agents are connected, or to which one of such agents is connected. Such a network may be any network, such as the internet. In one embodiment of the present invention, agents 50, 60 and 70 may be computers and/or server.

According to one embodiment of the present invention, sync servlet functionality may be added to a dynamic content servlet. While sync servlet functionality differs from that of a dynamic content, sync servlet functionality may generally be piggybacked onto a dynamic content servlet to avoid running multiple servlets, as shown in FIG. 1.

In one embodiment of the present invention, requests to share data dynamically or other related instructions may be incorporated into a predefined XML schema in either an HTTP post or an HTTPS post. HTTP (Hyper Text Transfer Protocol) is a generic message transport standard, or a standardized way of communicating over the internet. An HTTP Get is what a web browser does; it only receives data. But an HTTP Post allows sending of a body of data and also receipt of an answer.

The body of data sent by the HTTP Post is organized via XML schema. XML (Extensible Markup Language) is a standardized way of encoding data, or in other words, genericizing the data, enabling definition, transmission, validation, and interpretation of the data between applications.

Interface design details implementing the embodiment of the invention illustrated in FIG. 1 are set forth below in Example 1, where text representations of dynamic data content servlet input schema are shown. While the dynamic data content servlet implementation set forth hereinbelow is written in Java, such functionality may be implemented in any suitable programming language, or run under any web server. Other standards-based servers and protocols may also be used to implement dynamic data content servlets. Dynamic data content servlets may accept HTTP posts with a defined XML encoded body to enter, get, remove, or replace data. Using such a functionality, a dynamic data content object contained by each test running in a given flow may then post data to, get data from, modify data, or remove data from the dynamic data content servlet. The dynamic data content servlet may be posted to using HTTP or HTTPS (secure socket layer) to ensure security.

EXAMPLE 1

Wqm Dynamic Content Servlet Interface Design (A) Input and Output Interface to the Dynamic Content Servlet
(1) Brief Description
The Dynamic Content Servlet will run on any QoSM WQM agent. It provides a data store for dynamic data of running tests and processes requests to "add", "remove", or "get" dyanmic data for a specific uniqueid, or to "delete" all data for that uniqueid.
(2) Dynamic Data Design Related Assumptions
The following attributes are found in the Wireless section of fh.conf. They may be overwritten by hidden (fh prefix) attributes in the Wireless Chain Test itself.
DcsLocation 2—(String) default is the same as the Host (ATC) attribute.
DcsPort 2—(Integer) default is 16716
DcsTimeout 2—(Integer) default 0 (look once, no waiting)
DcsLookup 2—(Boolean) default true (check DCS if not in local store)
The following must be available in the flow level data stores:
DcsLocation
DcsPort
DcsTimeout
DcsLookup
ChainId—(String) a unique id for this test execution
FlowId—(String) the name of the current flow
A DcsControl test component will be available to change the values of the Dcs* attributes described above
The DcsPurgeTime entry in the Wireless section of fh.conf will define the age at which to purge old data in DCS (in hours)
(3) Technical Requirements
Ability to run a servlet on the QOSM agent.
Defined XML interface for the HTTP Request and Response.
(4) Definition or Design Description
The interface to the servlet will be an HTTP Post.
Example url ! http://<DcsLocation>:<DcsPort 2>/DynamicContentServlet 2
The body of the post will be XML. The XML interface is defined herein.
The behavior of the DCS mimics a Hashtable:
   It is not legal to store a null key or value, a NullPointerException will result.
   A "put" returns the value previously stored (or null if no value was found)
   A "get" returns the value stored (or null if no value was found)
   A "remove" returns the value previouly stored (or null if no value was found)
A "delete" removes all data for a unique id, and returns all values previously stored.
The DCS has some special behavior when storing "Sync" datum is stored.
   The name of the Sync datum is "dcs_sync<fromFlow>:<toFlow>"
   The value stored for a Sync type datum is an integer.
   If a value already exists for this datum, it is incremented by another "put"
   The value for this datum is decremented by a "get", if the resulting value is 0, the datum is removed.
Purging of old data not properly removed at the end of test execution is carried out.
   The DcsPurgeTime value found in fh.conf is used as the age to delete old test data, with a default of 24 hours.
   The frequency of checking for old data to purge is based on the aging value (1/10th the value).
(5) SITE Dependencies
TDL code that can call the DynamicContentServlet 2, wait for the reponse and accept the output.
(6) Generating and parsing the XML in Tcl and Java
Description
   Learning curve on parsing XML
Resolution/Progress:
   Learning the Document Object Model in jdk1.4.1 to parse XML
   Utilizing procedures already present in Tdl for handling XML
(7) Building the outgoing XML in java
Description
   Learning curve on parsing XML
Resolution/Progress:
   Learning the Document Object Model in jdk1.4.1 to parse XML Assumptions
   The XML sent must be in the correct form or will not be validated.

Technical Requirements
   The interface is an HTTP Post that contains an XML body as the input to the servlet.
   The output is the Post response, also in XML format.

(B) Definition or Design Description
(1) Input "put" Request Syntax
    <DcsRequest>
        <UniqueId> chainId </UniqueId>
        <Action> put </Action>
        <DynamicData> (can contain multiple Datum tags)
            <Datum>
                <Name> datumName </Name>
                <Type> datumType </Type>
                <Value> datumValue </Value>
            </Datum>
        </DynamicData>
    </DcsRequest>
(2) Input "put" Sync Request Syntax
    <DcsRequest>
        <UniqueId> chainId </UniqueId>
        <Action> put </Action>
        <DynamicData>
            <Datum>
                <Name> dcs_sync:<fromFlow>:<toFlow> </Name>
                <Type> Integer </Type>
                <Value> 1</Value>
            </Datum>
        </DynamicData>
    </DcsRequest>
(3) Input "get" Request Syntax
    <DcsRequest>
        <UniqueId> chained </UniqueId>
        <Action> get </Action>
        <Timeout> 60</Timeout>
        <DynamicData> (can contain multiple Datum tags)
            <Datum>
                <Name> datumName </Name>
            </Datum>

```
    </DynamicData>
</DcsRequest>
```
(4) Input "get" Sync Request Syntax
```
<DcsRequest>
    <UniqueId> chainId </UniqueId>
    <Action> get </Action>
    <DynamicData>
        <Datum>
            <Name>      dcs_sync:<fromFlow>:<toFlow>
            </Name>
        </Datum>
    </DynamicData>
</DcsRequest>
```
(5) Input "remove" Request Syntax
```
<DcsRequest>
    <UniqueId> chainId </UniqueId>
    <Action> remove </Action>
    <Timeout> 60</Timeout>
    <DynamicData> (can contain multiple Datum tags)
        <Datum>
            <Name> datumName </Name>
        </Datum>
    </DynamicData>
</DcsRequest>
```
(6) Input "delete" Request Syntax—deletes all data for a particular chain id
```
<DcsRequest>
    <UniqueId> chainId </UniqueId>
    <Action> delete </Action>
</DcsRequest>
```
(7) Output Response Syntax if no Exception
```
<DcsResponse>
    <UniqueId> chainId </UniqueId>
    <Action> (action from request)</Action>
    <DynamicData> (can contain multiple Datum tags)
        <Datum>
            <Name> datumName </Name>
            <Type> datumType </Type>
            <Value> datumValue </Value>
        </Datum>
    </DynamicData>
</DcsResponse>
```
(8) Output Response Syntax if Exception
```
<DcsResponse>
    <UniqueId> chained </UniqueId>
    <Action> (action from request)</Action>
    <Exception>
        <Type> exception type </Type>
        <Message> exception message </Message>
        <StackTrace> exception stack trace </StackTrace>
    </Exception>
</DcsResponse>
```
(9) SQM (Firehunter) Dependencies
  None
(10) SITE Dependencie
  Ability to do an HTTP Post to the servlet with the correct XML body.
  Ability to receive the post response XML.
(11) JUnit Testing Strategy
  Test by running unit tests on the actual interface.

The dynamic content servlet schemata set forth above and illustrated in the Figures are only examples. The present invention is not limited to such schemata; other schemata may be used and still fall within the scope of the present invention; provided, however, that appropriate changes are made to the dynamic content servlets and their corresponding test components. Moreover, schemata of the present invention are not limited to XML; other markup ("tag") languages and corresponding test components may also be employed.

Figure 2:
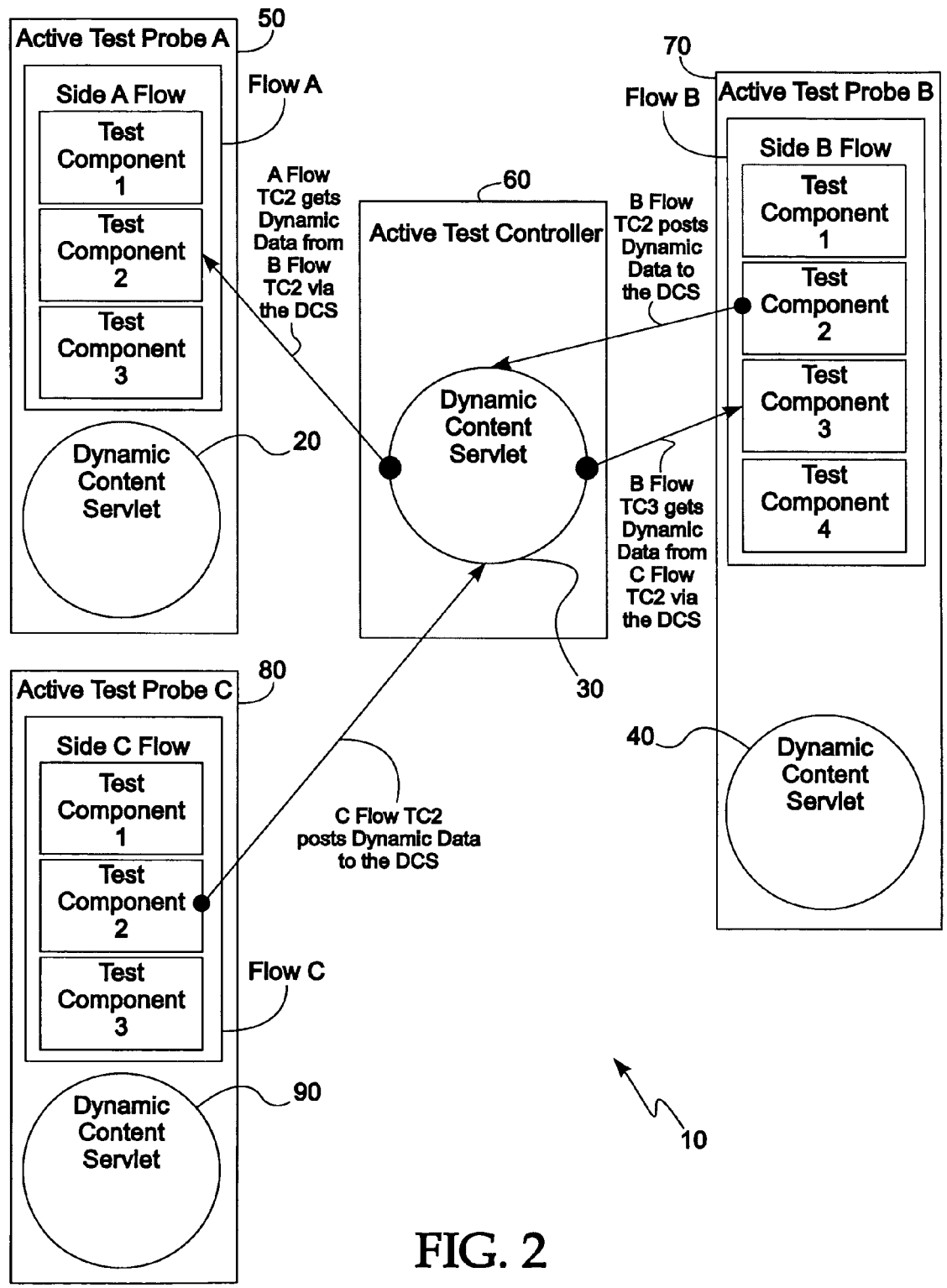
FIG. 2 illustrates another embodiment of the present invention.

FIG. 2 shows another embodiment of the present invention, where three Flows A, B and C are initiated concurrently. Execution of Test Component 2 in Flow B causes Flow B to generate dynamic data that are required for Test Component 2 in Flow A to be successfully executed. Once generated in Test component 2 of Flow B, such dynamic data are posted from Flow B to dynamic data content servlet 30. When Flow A has proceeded to Test Component 2, the dynamic data content residing on sync servlet 30 is retrieved by Test Component 2 in Flow A. Dynamic data generated in Test component 2 of Flow C are posted from Flow C to dynamic data content servlet 30. When Flow B has proceeded to Test Component 3, the dynamic data content residing on sync servlet 30 is retrieved by Test Component 3 in Flow B. Flows A, B and C may now proceed to complete execution, the necessary dynamic data content having been shared or transferred between or among Flows A, B and C.

Figure 3:
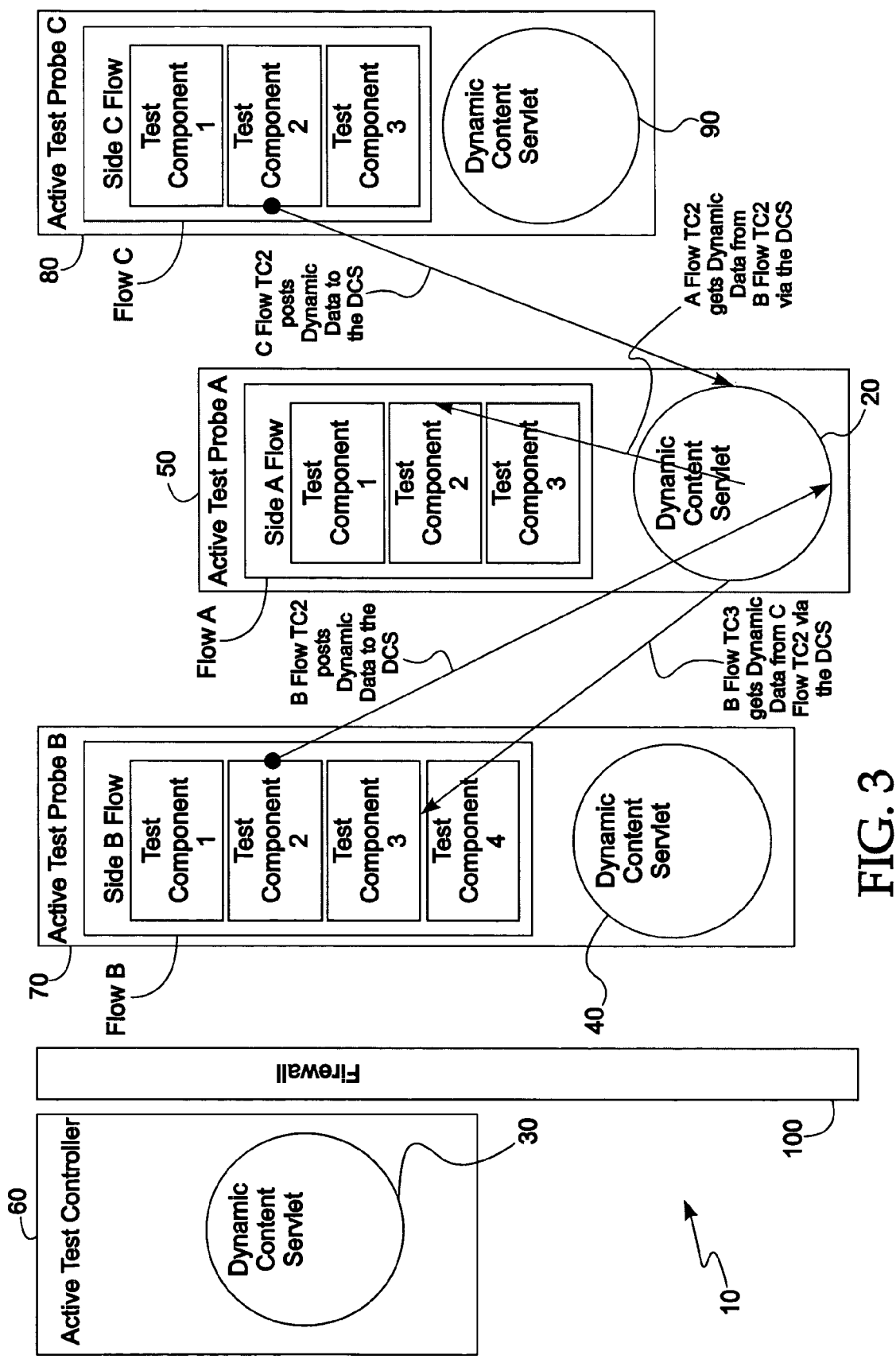
FIG. 3 illustrates yet another embodiment of the present invention.

FIG. 3 shows another embodiment of the present invention, where firewall 100 is disposed between Active Test controller 60 and Flows A, B and C. Flows A, B and C are initiated concurrently. Each flow runs its first test component. Because firewall 100 is disposed between Active Test Controller 60 and Active Test Probes 50, 70 and 80, however, dynamic data content servlet 30 may not be used. Nevertheless, in the embodiment of the present invention shown in FIG. 3, any dynamic data content servlet may be accessed by any of Active Test Probes 50, 70 or 80, thereby rendering system 10 operative. In FIG. 3, dynamic data content servlet 20 of Active Test Probe 50 is employed to fulfill such a function.

In FIG. 3, execution of Test Component 2 in Flow B causes Flow B to generate dynamic data that are required for Test Component 2 in Flow A to be successfully executed. Once generated in Test component 2 of Flow B, such dynamic data are posted from Flow B to dynamic data content servlet 20. When Flow A has proceeded to Test Component 2, the dynamic data content residing on sync servlet 20 is retrieved by Flow A. Execution of Test Component 2 in Flow C causes Flow C to generate dynamic data that are required for Test Component 3 in Flow B to be successfully executed. Once generated in Test component 3 of Flow C, such dynamic data are posted from Flow C to dynamic data content servlet 20. When Flow B has proceeded to Test Component 3, the dynamic data content residing on sync servlet 20 is retrieved by Test Component 3 in Flow B. Flows A, B and C may now proceed to complete execution, the necessary dynamic data content having been shared or transferred between or among Flows A, B and C.

Various protocols are described herein, such as XML, HTTP, and HTTPS. The present invention in not limited to such protocols, however, and explicitly contemplates the use of other protocols such as FTP ("File Transfer Protocol"), SCP ("Secure Copy Protocol") and SFTP ("Secure File Transfer Protocol"). Similarly, various networks are described herein, such as a LAN, a wireless network, a wire line network, and the internet. The present invention in not limited to such networks; other networks may be employed and fall within the scope of the present invention.

The present invention may be employed successfully over a wide range of wireless network types and standards, including, but not limited to, wifi 802.11a, wifi 802.11b, wifi 802.11g, wimax, GSM/GPRS and CDMA, as well as other standards yet to be devised or implemented. Moreover, the present invention is not limited in scope to wireless test applications, but instead includes within its scope wireline test applications such as Ethernet/LAN and dial-up networks.

In a preferred embodiment, the dynamic data sharing or transfer methods of the present invention are carried out using an Agilent QoS ("Quality of Service") Manager Agent, many aspects of which are described at: http://we.home.agilent.com/cqi-bin/bvpub/agilent/Product/cp_Product.isp?OID=536882909&NAV_ID=-536885380.536882909.00&LANGUAGE_CODE=enq&COUNTRY_CODE=ZZ&CT=PRO DUCT&JPID=/comms/firehunter Note that certain aspects and applications of various embodiments of the present invention may be employed in the devices, systems and methods disclosed in U.S. patent application Ser. No. 10/736,835 entitled "Sequential Coordination of Test Execution and Dynamic Data" to Bingham, which is hereby incorporated by reference herein in its entirety.

Although a few embodiments of the present invention have been shown and described, it will be appreciated by those skilled in the art that changes may be made to such embodiments without departing from the scope and spirit of the invention, the scope of which is defined in the appended claims and their equivalents. For example, a system or agent carrying out one or more dynamic data sharing or transfer methods of the present invention by means of one or more proxies falls within the scope of the present invention.

We claim:

1. A method of sharing or transferring dynamically-generated data between or among multi-sided test components in a system having at least a first flow and a second flow, comprising:
   configuring a dynamic content servlet executing in a computer;
   generating, in the first flow, dynamic data;
   posting, using at least one open common communication standard, the dynamic data to the dynamic content servlet to form posted dynamic data;
   storing the posted dynamic data by the dynamic content servlet in the computer;
   while the first flow is posting the dynamic data, requesting, from the second flow to the dynamic content servlet, the posted dynamic data; and
   transferring the posted dynamic data from the dynamic content servlet to the second flow to enable sharing of the posted dynamic data between the first flow and the second flow.

2. The method of claim 1, further comprising entering dynamic data in the dynamic content servlet.

3. The method of claim 1, further comprising getting dynamic data from the dynamic content servlet.

4. The method of claim 1, further comprising removing dynamic data from the dynamic content servlet.

5. The method of claim 1, further comprising replacing dynamic data in the dynamic content servlet.

6. The method of claim 1, further comprising substantially simultaneously initiating the first flow and the second flow.

7. The method of claim 6, further comprising pausing execution in at least one of the first flow and the second flow.

8. The method of claim 7, further comprising sending, from the flow not paused, a synchronization signal to a synch servlet.

9. The method of claim 8, further comprising requesting, from the paused flow to the sync servlet, permission to resume execution.

10. The method of claim 9, upon receipt of the synchronization signal by the synch servlet, further comprising granting permission to the paused flow to resume execution.

11. The method of claim 10, further comprising resuming execution of the paused flow.

12. The method of claim 11, wherein the sync servlet receives an "Await Sync" signal from the paused flow.

13. The method of claim 11, wherein the synchronization signal received by the sync servlet is a "Send Sync" signal.

14. The method of claim 1, wherein the system is a wireless system.

15. The method of claim 1, wherein the system is a wireline system.

16. The method of claim 1, further comprising subjecting the system to a plurality of functional tests.

17. The method of claim 1, wherein the open common communication standard is selected from the group consisting of HTTP, HTTPS, FTP, SCP and SFTP.

18. The method of claim 1, wherein schemata selected from the group consisting of XML, a markup language and plain text are employed to effect sharing or transferring of dynamically generated data.

19. The method of claim 1, wherein a location of the dynamic content servlet is specified.

20. The method of claim 19, wherein the location of the dynamic content servlet is changed.

21. The method of claim 1, wherein the dynamic content servlet is run on a wireless QOS agent.

22. The method of claim 1, wherein the dynamic content servlet is run on a web server.

23. The method of claim 1, wherein the dynamic content servlet is configured accept at least one of an HTTP post, an HTTPS post, an FTP post, an SCP post and an SFTP post.

24. The method of claim 1, wherein the dynamic content servlet accepts an XML encoded post to enter, get, remove, modify or replace data.

25. The method of claim 1, wherein the dynamic content servlet further comprises sync servlet content functionality.

26. A system for sharing or transferring dynamically-generated data between or among multi-sided test components in a system having at least a first flow and a second flow, comprising:
   means for configuring a dynamic content servlet executing in a computer;
   means for generating, in the first flow, dynamic data;
   means for posting, using at least one open common communication standard, the dynamic data to the dynamic content servlet to form posted dynamic data;
   means for storing the posted dynamic data by the dynamic content servlet in the computer;
   while the first flow is generating the dynamic data means for requesting, from the second flow to the dynamic content servlet, the posted dynamic data; and
   means for transferring the posted dynamic data from the dynamic content servlet to the second flow to enable sharing of the posted dynamic data between the first flow and the second flow.

27. The system of claim 26, further comprising means for substantially simultaneously initiating at least the first flow and the second flow.

28. The system of claim 27, further comprising means for pausing execution in at least one of the first flow and the second flow.

29. The system of claim 28, further comprising means for sending, from the flow not paused, a synchronization signal to a sync servlet.

30. The system of claim 29, further comprising means for requesting, from the paused flow to the sync servlet, permission to resume execution.

31. The system of claim 30, upon receipt of the synchronization signal by the synch servlet, further comprising means for granting permission to the paused flow to resume execution.

32. The system of claim 31, further comprising means for resuming execution of the paused flow.

33. The system of claim 26, wherein the system is configured to test wireless systems operating under at least one of the wifi 802.11a standard, the wifi 802.11b standard, the wifi 802.11g standard, the wimax standard, the GSM/GPRS standard, the CDMA standard.

34. The system of claim 26, wherein the system is configured to test a wireline system selected from the group consisting of a LAN network and a dial-up network.

35. A test agent for causing the remote sharing or transferring of dynamically-generated data between or among multi-sided test components in a system having at least a first flow and a second flow, comprising:
   means for causing a dynamic content servlet to be configured to execute in a computer;
   means for causing dynamic data to be generated in the first flow;
   means, using at least one open common communication standard, for causing dynamic data to be posted to the dynamic content servlet to form posted dynamic data;
   means for causing the posted dynamic data to be stored by the dynamic content servlet in the computer;
   means for causing a request generated in the second flow to retrieve the posted dynamic data to be generated and sent to the dynamic content servlet while the first flow is generating the dynamic data; and
   means for causing the posted dynamic data to be transferred from the dynamic content servlet to the second flow to enable sharing of the posted dynamic data between the first flow and the second flow.

36. The test agent of claim 35, wherein the test agent is configured to test wireless systems operating under at least one of the wifi 802.11a standard, the wifi 802.11b standard, the wifi 802.11g standard, the wimax standard, the GSM/GPRS standard, the CDMA standard.

37. The test agent of claim 35, wherein the test agent is configured to test a wireline system selected from the group consisting of a LAN network and a dial-up network.

38. A method of manufacturing and using a test agent for causing the remote sharing or transferring of dynamically-generated data between or among multi-sided test components in a system having at least a first flow and a second flow, the method comprising the steps of:
   programming a first agent to receive dynamic data generated in the first flow;
   programming a second agent to post the dynamic data to a dynamic content servlet to form posted dynamic data;
   programming a third agent to store the posted dynamic data by the dynamic content servlet in a computer executing the dynamic content servlet:
   programming a fourth agent to retrieve by the request generated in the second flows, the posted dynamic data while the first flow is generating the dynamic data;
   programming a fifth agent to send the posted dynamic data to the second flow;
   manufacturing the test agent by operatively assembling and connecting the first agent, the second agent, the third agent, the fourth agent, and the fifth agent; and
   executing the test agent in the computer to enable sharing of the posted dynamic data between the first flow and the second flow.

39. The method of claim 38, wherein the test agent is configured to remotely synchronize the flow of dynamically-generated data between or among multi-sided test components.

40. The method of claim 38, wherein the test agent is configured to test wireless systems operating under at least one of the wifi 802.11a standard, the wifi 802.11b standard, the wifi 802.11g standard, the wimax standard, the GSM/GPRS standard, the CDMA standard.

41. The method of claim 38, the test agent is configured to test
   a wireline system selected from the group consisting of a LAN network and a dial-up network.

* * * * *

UNITED STATES PATENT AND TRADEMARK OFFICE
CERTIFICATE OF CORRECTION

| | |
|---|---|
| PATENT NO. | : 7,203,625 B2 |
| APPLICATION NO. | : 11/195979 |
| DATED | : April 10, 2007 |
| INVENTOR(S) | : Bingham et al. |

It is certified that error appears in the above-identified patent and that said Letters Patent is hereby corrected as shown below:

In column 10, line 55, in Claim 26, after "data" insert -- , --.

In column 12, line 17, in Claim 38, after "servlet" delete ":" and insert -- ; --, therefor.

In column 12, line 18, in Claim 38, after "retrieve" insert -- , --.

In column 12, line 19, in Claim 38, after "second" delete "flows" and insert -- flow --, therefor.

Signed and Sealed this

Seventh Day of August, 2007

JON W. DUDAS
*Director of the United States Patent and Trademark Office*